(12) United States Patent
Katz et al.

(10) Patent No.: US 10,095,031 B1
(45) Date of Patent: Oct. 9, 2018

(54) NON-OVERLAPPED STEREO IMAGING FOR VIRTUAL REALITY HEADSET TRACKING

(71) Applicant: Oculus VR, LLC, Menlo Park, CA (US)

(72) Inventors: Dov Katz, Las Vegas, NV (US); Oskar Linde, Belmont, CA (US); Kjell Erik Alexander Sjoholm, San Francisco, CA (US); Rasmus Karl Emil Simander, San Francisco, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/990,501

(22) Filed: May 25, 2018

Related U.S. Application Data

(63) Continuation of application No. 14/986,645, filed on Jan. 1, 2016.

(51) Int. Cl.
*G02B 27/01* (2006.01)
*G06T 19/00* (2011.01)

(52) U.S. Cl.
CPC .......... *G02B 27/017* (2013.01); *G06T 19/006* (2013.01); *G06T 2219/2004* (2013.01)

(58) Field of Classification Search
CPC .................................................. G02B 27/017
See application file for complete search history.

(56) References Cited

U.S. PATENT DOCUMENTS

| 2003/0158654 | A1 | 8/2003 | Morita | |
|---|---|---|---|---|
| 2005/0024388 | A1* | 2/2005 | Takemoto | G06T 19/006 345/633 |
| 2007/0095588 | A1* | 5/2007 | Mattes | B60T 8/172 180/197 |
| 2010/0066860 | A1* | 3/2010 | Tsurumi | G06T 3/4038 348/231.2 |
| 2011/0229012 | A1 | 9/2011 | Singhal | |
| 2012/0154604 | A1* | 6/2012 | Chen | H04N 17/002 348/187 |
| 2013/0194259 | A1 | 8/2013 | Bennett et al. | |

(Continued)

OTHER PUBLICATIONS

Riisgaard, S. et al., "SLAM for Dummies," MIT Open Courseware, 2005, 127 pages.

(Continued)

*Primary Examiner* — Jitesh Patel
(74) *Attorney, Agent, or Firm* — Fenwick & West LLP

(57) ABSTRACT

A virtual reality (VR) headset includes a first camera and a second camera capturing image data of an environment of the VR headset. Each camera has a field of view, and a portion of the fields of view of the first and second cameras overlap while a portion of the fields of view do not overlap. A processor receiving the image data from the first and second cameras is configured to identify a first observation of a position of the VR headset in the environment and positions of a plurality of features based on the image data captured by the first camera. The processor also identifies a second observation of the position of the VR headset in the environment and the positions of the features based on the image data captured by the second camera. Based on the first and second observations, the processor determines a model of the environment.

20 Claims, 4 Drawing Sheets

(56) References Cited

U.S. PATENT DOCUMENTS

| | | | |
|---|---|---|---|
| 2014/0361977 A1* | 12/2014 | Stafford | G02B 27/0093 |
| | | | 345/156 |
| 2014/0375680 A1 | 12/2014 | Ackerman et al. | |
| 2015/0316767 A1* | 11/2015 | Ebstyne | G06T 7/80 |
| | | | 345/8 |
| 2016/0260251 A1 | 9/2016 | Stafford et al. | |
| 2017/0045941 A1* | 2/2017 | Tokubo | G06F 3/167 |

OTHER PUBLICATIONS

United States Office Action, U.S. Appl. No. 14/986,645, filed Oct. 4, 2017, 19 pages.

* cited by examiner

NON-OVERLAPPED STEREO IMAGING FOR VIRTUAL REALITY HEADSET TRACKING

CROSS REFERENCE TO RELATED APPLICATIONS

This application is a continuation of co-pending U.S. application Ser. No. 14/986,645, filed Jan. 1, 2016, which is incorporated by reference in its entirety.

BACKGROUND

The present disclosure generally relates to virtual reality systems, and more specifically relates to mapping an environment in which a virtual reality system is used.

Virtual reality (VR) devices deliver media to users based at least in part on the position and movement of a headset worn by a user. Some VR devices deliver media augmenting or interacting with an environment in which the user is using the headset, or influenced by objects or features in the environment. For example, the VR device may display media to the user that includes virtual objects placed within the user's environment. To display media based on the user's environment, these VR devices often include a camera that maps out features in the environment. However, using a single camera to map features in the environment does not provide enough information to accurately identify the features in the environment or permit the determination of scale of those features. Likewise, there may not be enough information to determine the position of the VR headset relative to the features. Thus, the media presented by these systems may not accurately follow the actual position of the VR headset.

SUMMARY

A virtual reality (VR) system uses two or more cameras mounted on a virtual reality headset worn by a user to map an environment in which the headset is used and present media to the user based at least in part on the environment. The two or more cameras capture image data of the environment, and each has a field of view corresponding to an angle of the environment visible to the imaging electronics of the camera. A portion of the fields of view of the cameras overlap, while a portion of the fields of view do not overlap. The portion that does not overlap increases the area of the environment that can be imaged by the cameras, while the overlapping portions enables correlation of the image data to improve the accuracy of the environment's mapping and provide a scale for the objects in the environment.

A processor in the VR headset or in a system external to the headset receives the image data from the cameras. The processor uses the image data captured by the first camera to identify a first observation of a position of the VR headset in the environment and positions of a plurality of features in the environment. The features in the environment may include, for example, lines, corners, or edges detected in the image data captured by the first camera. The processor similarly uses the image data captured by the second camera to identify a second observation of the position of the VR headset in the environment and positions of the features. Based on the first observation and the second observation, the processor generates a three-dimensional model of the environment. The three-dimensional model of the environment includes a geometry of the environment, representing relative positions of features with respect to one another. The model may also include representations of objects or boundaries in the environment, which are determined based on the features identified in the environment.

The VR system uses the mapped environment, including the model of the environment and the determined location of the headset within the environment, to present media to the user. For example, the content of the media displayed to the user may be based on the environment. As another example, the content of the media may be based on the movement of the user within the environment or the movement of objects in the environment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Virtual Reality System Architecture

Figure 1:
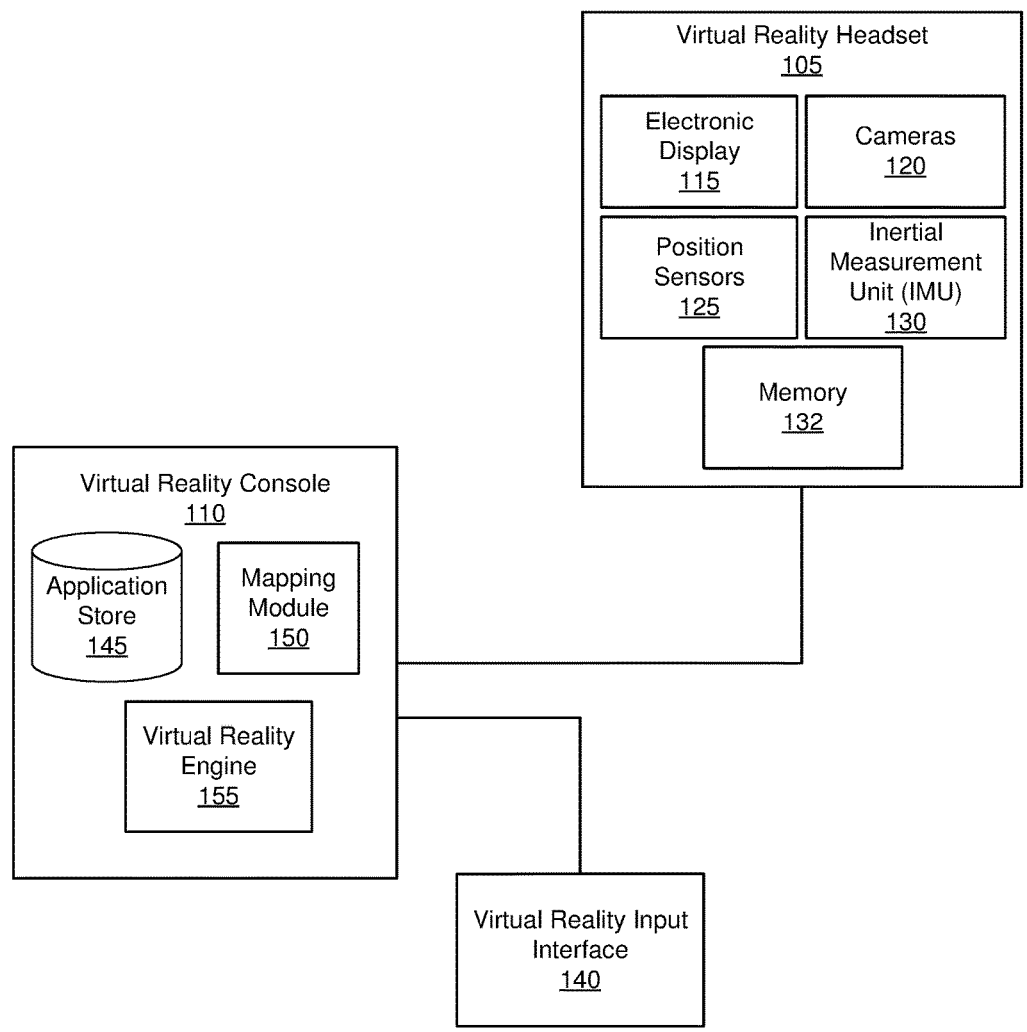
FIG. 1 is a block diagram of a system environment in which a virtual reality console operates, in accordance with an embodiment.

FIG. 1 is a block diagram of one embodiment of a virtual reality (VR) system environment 100 in which a VR headset 105 operates. The system environment 100 shown by FIG. 1 comprises the VR headset 105 and a VR input interface 140 that are each coupled to a VR console 110. While FIG. 1 shows an example system 100 including one VR headset 105 and one VR input interface 140, in other embodiments any number of these components may be included in the system 100. For example, there may be multiple VR headsets 105 each having an associated VR input interface 140, with each VR headset 105 and VR input interface 140 communicating with the VR console 110. In alternative configurations, different and/or additional components may be included in the system environment 100.

As further described below, the VR headset 105 presents media to a user that is based at least in part on the environment in which the headset is operated. In an example application, the content of the media presented by VR headset 105, such as virtual objects or characters included in the media and the positions of the objects or characters, are based on the model of the environment. For example, if the user operates the VR headset 105 in a classroom with chairs and desks, the model includes representations of the chairs and desks and the media includes virtual characters displayed as sitting in the chairs and virtual objects displayed on the desks. As another example, if the user operates the VR headset in a park with walking paths, the model includes boundaries of the walking path and representations of trees adjacent to the path, and the media includes virtual characters displayed walking along the paths and virtual animals displayed in trees adjacent to the path. The VR headset 105 may alternatively display media based on the user's interaction with or movements relative to the features in the environment. For example, the media displayed may be influenced by the speed and distance a user runs along a path. As another example, a virtual object or character is moved based on the user's movement of a physical object in the environment.

To present media based on the environment in which the VR headset 105 is operated, the VR headset 105 includes two cameras capturing image data of the environment. The image data from each camera is used to separately map the environment by identifying features in the environment and determining a position of the VR headset relative to the features. In one embodiment, as further described below, the image data from each camera is processed by a simultaneous localization and mapping (SLAM) algorithm to identify the features and determine the headset's position. The features and position of the headset from the two image streams are then correlated, and the correlation is used to improve the accuracy of the headset's location relative to the features. The use of two cameras also provides binocular vision to determine a three-dimensional model of the features in the environment. Thus, using two cameras to image the environment improves the accuracy of determining the headset's position relative to the environment's features over systems using a single camera.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. In various embodiments, the VR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. An example embodiment of the VR headset 105 is further described below in conjunction with FIG. 2.

As shown in FIG. 1, the VR headset 105 includes an electronic display 115, at least two cameras 120, one or more sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). In some embodiments, the media provided to the electronic display 115 for presentation to the user is pre-distorted to aid in correction of one or more types of optical errors. Additionally, the optical components may increase a field of view of the displayed media through magnification or through another suitable method. For example, the field of view of the displayed media is such that the displayed media is presented using a portion of the user's field of view (e.g., 110 degrees diagonal), or is displayed such that the displayed media is presented using all of the user's field of view (e.g., 180 degrees diagonal).

The two or more cameras 120 capture image data of an environment in which the VR headset 105 is operated. In one embodiment, the cameras 120 record a continuous stream of video data while the VR headset 105 is operated that can be analyzed to detect points of interest in the environment. Alternatively, the cameras 120 may capture still-frame images at specified intervals of time (e.g., once every 0.5 seconds) while the VR headset 105 is operated. In one embodiment, at least part of the image data captured by the cameras 120 is displayed to the user of the headset 105 by the electronic display 115, enabling the user to view the surrounding environment and virtual augmentations to the environment.

The IMU 130 is an electronic device that generates motion data based on measurement signals received from one or more of the sensors 125. The motion data includes, for example, translational or rotational velocity and translational or rotational acceleration of the VR headset 105. To generate the motion data, a sensor 125 generates one or more measurement signals in response to motion of the VR headset 105, and may measure the absolute position or inertial movement of the sensor. Examples of the sensors 125 include: one or more accelerometers, one or more gyroscopes, one or more magnetometers, or any other suitable type of sensor, or some combination thereof. The sensors 125 may be located external to the IMU 130, internal to the IMU 130, or some combination thereof.

Based on the one or more measurement signals from one or more sensors 125, the IMU 130 generates motion data indicating an estimated position of the VR headset 105 relative to an initial position of the VR headset 105. For example, the sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point (e.g., intermediate estimated position) on the VR headset 105. Alternatively, the IMU 130 provides the sampled measurement signals to the VR console 110, which determines the motion data. The reference point is a point that may be used to describe the position of the VR headset 105. The reference point may generally be defined as a point in space; however, in practice, the reference point is typically defined as a point within the VR headset 105 (e.g., a center of the IMU 130).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from the VR headset 105 and the VR input interface 140. In the example shown in FIG. 1, the VR console 110 includes an application store 145, a mapping module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions that, when executed by a processor, generates media for presentation to the user. Media generated by an application may be in response to inputs received from the user via movement of the HR headset 105 or the VR interface device 140. Examples of applications include: gaming applications, conferencing applications, video playback application, or other suitable applications.

The mapping module 150 maps the environment of the VR headset 105 and movements of the VR headset 105 within the environment using image data received from the cameras 120 and motion data received from the IMU 130. While FIG. 1 illustrates the mapping module 150 executed by the VR console 110 in one embodiment, one or more functions of the mapping module 150 may alternatively be executed by a processor within the VR headset 105.

Generally, the mapping module 150 maps the environment by periodically performing two SLAM algorithms—one for the image data received from each camera 120—and correlating the outputs from each algorithm. The SLAM algorithms are described, for example, in Søren Riisgaard and Morten Rufus Blas (2005), "SLAM for Dummies: A Tutorial Approach to Simultaneous Localization and Mapping," MIT Open Courseware, which is incorporated herein by reference in its entirety. Generally, each SLAM algorithm uses image data from a camera to identify features in the environment, such as walls, corners, or edges of objects, that are visible to the camera at an initial position of the headset 105. The mapping module 150 determines the position of a point on the headset 105 relative to these features, such as a distance and angle between a reference point on the headset and each feature. The mapping module 150 also tracks movement of the VR headset 105 using motion data captured by the IMU 130. For example, as the headset 105 is moved, the mapping module 150 determines a magnitude and direction of the headset's movement, and continually estimates distances and angles between the reference point on the headset and expected positions of each of the features.

When the VR headset 105 is moved to a new position, the mapping module 150 estimates a position of the VR headset 105 relative to the previously-identified features based on the motion data received from the IMU 130. The mapping module 150 also uses image data from each camera captured at the new position of the headset 105 to observe the features in the environment. These observations are compared to the position estimated based on the image data, and the comparison is used to update the position of the headset 105 relative to the features. After identifying the new position of the headset 105 relative to the known features, the mapping module 150 may identify one or more additional features in the environment using the image data. For example, the mapping module 150 identifies features that were not visible to the cameras at the initial position of the headset 105, but are visible at the new position. A process for mapping the environment and identifying the position of the headset in the environment is described further with respect to FIG. 4

The VR engine 155 executes applications within the system environment. Based at least in part on the features in the environment and the position of the VR headset 105 with respect to the features, the VR engine 155 determines media to provide to the VR headset 105 for presentation to the user. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
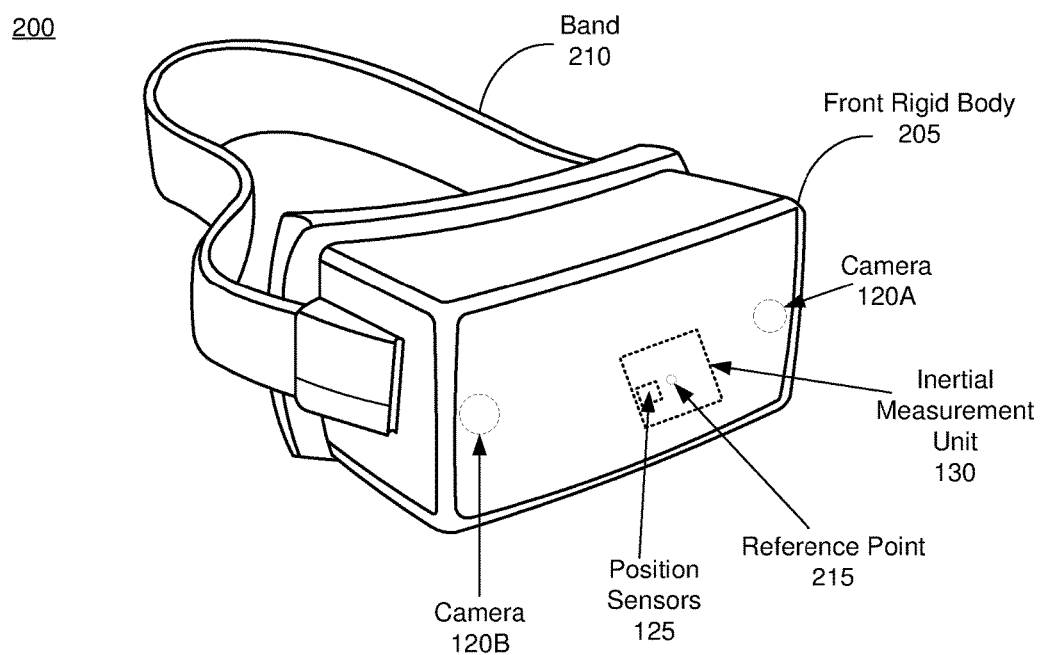
FIG. 2 is a wire diagram of a virtual reality headset, in accordance with an embodiment.

FIG. 2 is a wire diagram of one embodiment of a virtual reality headset. The VR headset 200 is an embodiment of the VR headset 105 and includes a front rigid body 205 and a band 210. The band 210 supports the front rigid body 205 when the VR headset 105 is worn by a user. The front rigid body 205 includes the electronic display 115 (not shown), the IMU 130, the one or more sensors 125, and the two or more cameras 120. In the embodiment shown by FIG. 2, the sensors 125 are located within the IMU 130 and neither the sensors 125 nor the IMU 130 are visible to the user. Furthermore, FIG. 2 illustrates a reference point 215 located at a center of the IMU 130, which in one embodiment is used as a reference point for tracking movement of the headset 105 through the environment. The reference point 215 may alternatively be located at other positions on the headset 105.

The cameras 120 are positioned on or within the front rigid body 205, and may not be visible to the user. In the embodiment of FIG. 2, the cameras 120 are positioned near opposite sides of the front rigid body 205: the camera 120A is positioned near a left side of the front rigid body 205, while the camera 120B is positioned near a right side. Each camera 120 has a field of view corresponding to an angle of the environment visible to the camera when in a fixed position. In one embodiment, the field of view of the camera 120A partially overlaps the field of view of the camera 120B.

Figure 3:
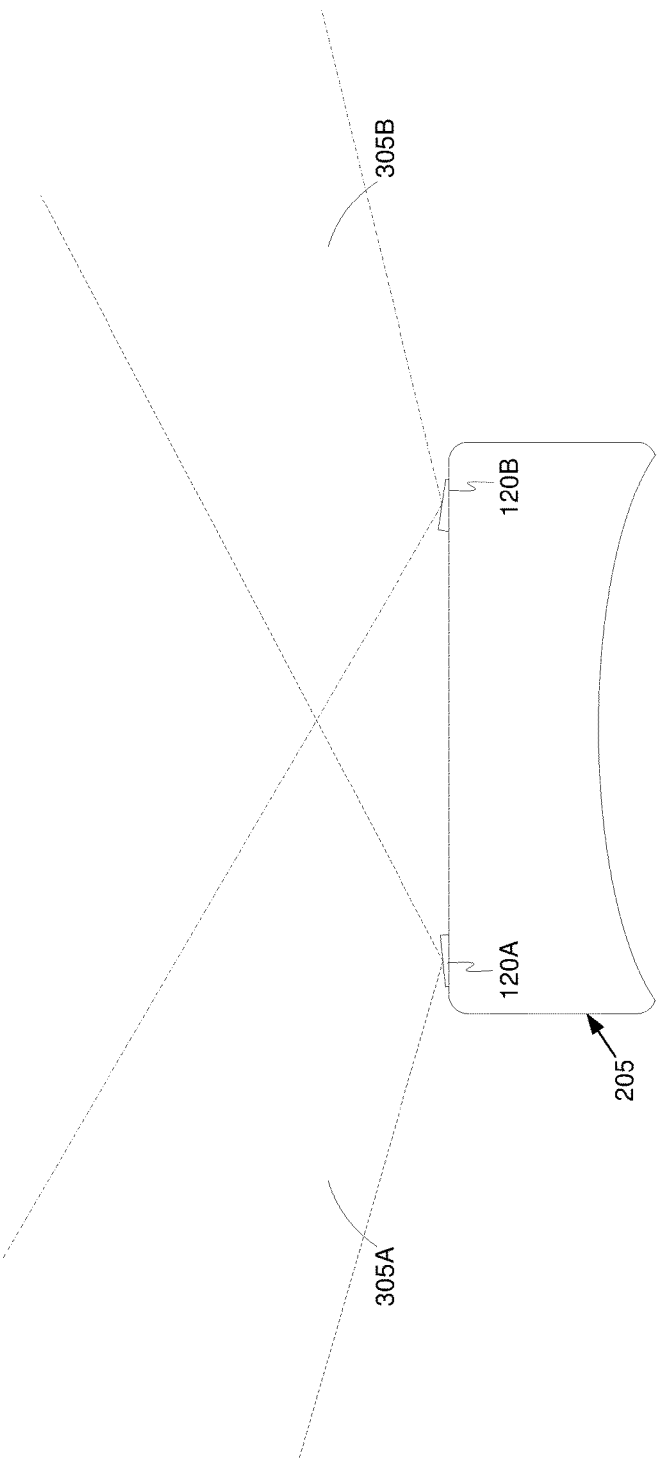
FIG. 3 is a schematic diagram of fields of view of headset cameras, in accordance with an embodiment.

Example fields of view of the cameras 120 are shown in FIG. 3. The first camera field of view 305A is an angle of the environment visible to the first camera 120A at a fixed position, while the second field of view 305B is an angle of the environment visible to the second camera 120B at a fixed position. As shown in FIG. 3, a portion of the field of view 305A overlaps a portion of the field of view 305B, while a portion of the field of view 305A does not overlap the field of view 305B. Similarly, a portion of the field of view 305B does not overlap the field of view 305A. The partial overlap between the fields of view 305A and 305B enables correlation between the features observed by both cameras, while the portions of the fields of view 305 that do not overlap increase the area of the environment that can be imaged by the cameras 120.

Tracking a Virtual Reality Headset Using Overlapped Cameras

Figure 4:
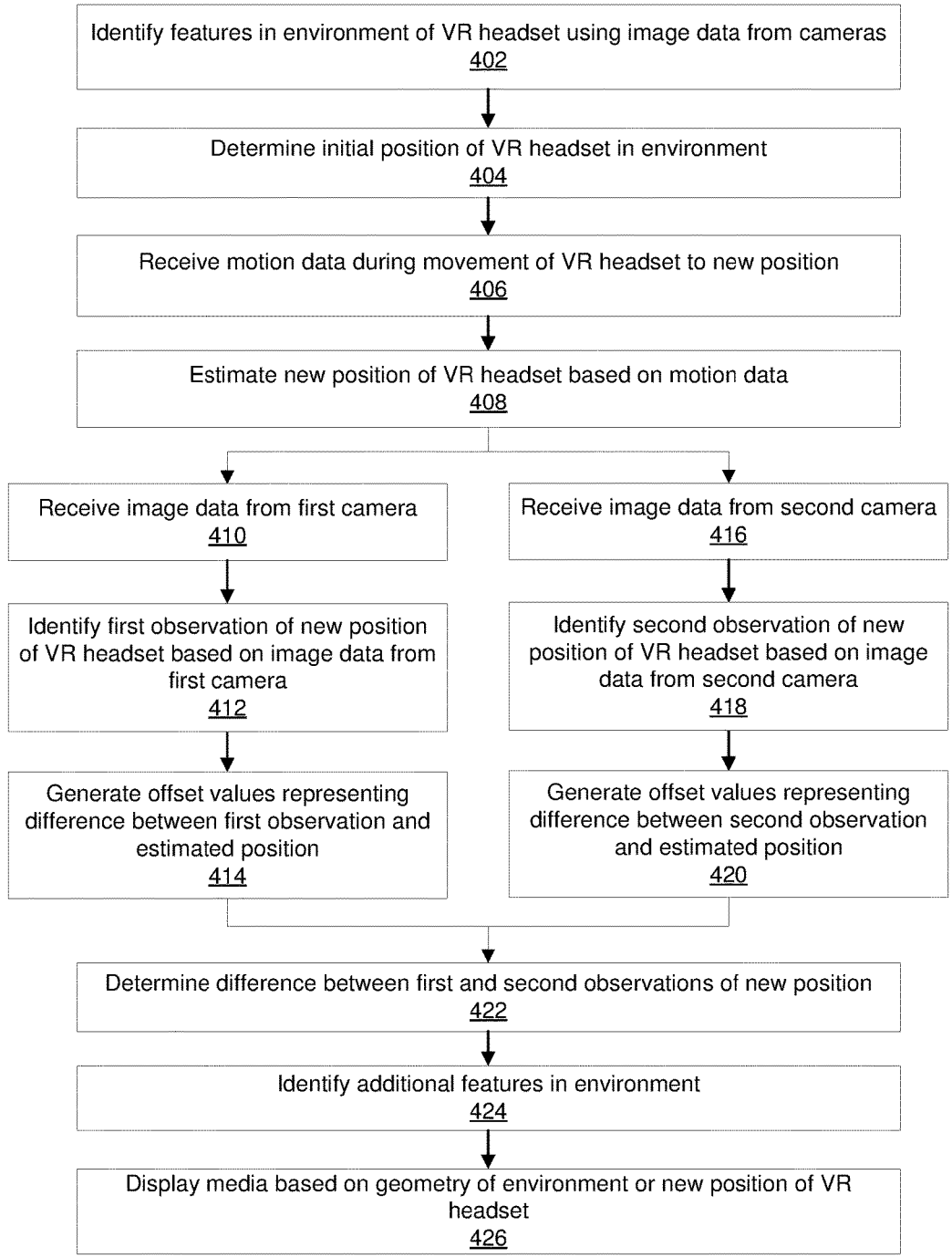
FIG. 4 is a flowchart illustrating a process for generating a three-dimensional model of an environment in which a virtual reality headset is used, in accordance with an embodiment.

FIG. 4 is a flowchart illustrating a process for tracking the VR headset 105 using cameras with overlapped fields of view, according to one embodiment. In one embodiment, the steps of the process are performed by the VR console 110. However, in other embodiments, the steps of the process are performed by a processor within the headset 105 or by another computing device. Other embodiments may also include additional, fewer, or different steps, and may perform the steps in different orders.

The VR console 110 receives image data from the cameras 120 while the VR headset 105 is located at an initial location in the environment. Using the image data, which may include one or more still frame images or video data, the VR console 110 identifies 402 features in the environment of the headset 105. The environment's features are any interest points in the environment that can be used to localize the VR headset 105 within the environment and may be relevant for the media presented by the VR console 110. Thus, the identified features may include, for example, any lines, corners, or edges, which may correspond, for example, to walls, objects, or boundaries in the environment. To identify the features, the VR console 110 may apply any of a variety of edge or corner detection algorithms to the image data received from the cameras 120. The VR console 110 may also determine objects or boundaries in the environment based on the features. For example, the VR console 110 may use a clustering or regression algorithm to determine features that are part of the same object, and store the determined features together as a representation of the object.

Based on the identified features, the VR console 110 determines 404 the initial position of the headset 105 in the environment. In one embodiment, a position of the headset 105 in the environment can be represented as distances between a reference point 215 on the headset and one or more reference points in the environment, angles between the reference point 215 and the reference points in the environment, and an orientation of the headset 105 with respect to a gravitational axis. Thus, for example, the VR console 110 determines 404 the initial position based on distances between the reference point 215 and at least a subset of the identified features and stores the distances and an orientation of the VR headset 105 as the initial position of the headset. The VR console 110 also stores the coordinates representing positions of the identified features in the environment.

As a user of the headset 105 views media displayed by the headset, the user may move the VR headset 105 to different locations in the environment by walking through the environment, rotating or tilting his head from the initial position of the headset, or otherwise moving the headset 105. The VR console 110 receives 406 motion data from the VR headset 105 as the headset is moved throughout the environment. When the headset 105 is moved to a new location in the environment, the VR console 110 uses the motion data to estimate 408 the new position. In one embodiment, the VR console 110 uses the motion data to determine a vector representing an estimate of the new position of the headset relative to the initial headset position. For example, the VR console 110 receives data from motion sensors 125 on the headset 105, such as an accelerometer and a gyroscope, measured by the sensors during the movement of the headset 105 from the initial position to the new position. The data from the motion sensors 125 includes directions and rates of the headset's movement, which can be used to derive information about the motion of the VR headset 105. The VR console 110 may alternatively receive motion data from other sensors, such as optical depth sensors positioned on the headset 105 or in the environment. Based on the received motion data, the VR console 110 determines a magnitude of the headset's movement and an angle between the initial position and the new position of the headset 105. In one embodiment, the VR console 110 continually tracks the movement of the VR headset 105 during use by calculating magnitudes and angles of the movement of the headset based on continuously-received motion data.

The VR console 110 also tracks movement of the VR headset 105 using image data captured by the cameras 120. To track the movement of the headset 105 from the initial position to the new position, the VR console 110 receives 410 image data from the first camera 120A on the headset 105 at the new position of the headset. The image data received from the first camera includes observations of at least a subset of the identified features in the environment. Based on the image data from the first camera 120A, the VR console 110 identifies 412 a first observation of the new position of the headset 105. For example, the VR console 110 determines the distance from the new position of the headset 105 to the features in the environment, and identifies the new position of the headset 105 based on a difference between the determined distance and the distance between the features and the initial position of the headset 105. For the new position of the VR headset 105, the VR console 110 generates 414 offset values representing a difference between the location of the headset 105 determined using the image data from the first camera and the location of the headset determined using the motion data. The VR console 110 stores the location of the headset 105 determined using the image data from the first camera 120A, as well as the offset values.

Similarly, the VR console 110 receives 416 image data from the second camera 120B captured at the new position of the headset. The image data from the second camera 120B includes observations of the features identified in the environment. Because a portion of the field of view of the second camera 120B overlaps a portion of the field of view of the first camera 120A, the subset of features visible in the image data captured by the second camera 120B may include some of the features visible in the image data captured by the first camera 120A. However, the subset may also include other features not visible to the first camera 120A that fall in a portion of the second camera's field of view that does not overlap the first camera's field of view. The VR console 110 uses the image data from the second camera to identify 418 a second observation of the new position of the headset 105. Like the first observation of the new position, the second observation may include a difference between a distance from the new position of the headset 105 to the features and a distance from the initial position of the headset 105 to the features. The VR console 110 also generates 420 offset values representing a difference between the location of the headset 105 determined using the image data from the second camera and the location of the headset determined using the motion data. The VR console 110 stores the offset values and the location of the headset determined using the image data from the second camera 120B.

The VR console 110 determines 422 a difference between the first observation of the new position and the second observation of the new position, and uses the determined difference to improve the measurements of the environment. In one embodiment, the VR console 110 uses the difference between the observations, the offset values corresponding to each observation, and a known geometric relationship between the cameras 120 to improve the calculations of the headset's position in the environment and the position of the objects in the environment. For example, the VR console 110 may improve the accuracy of the estimated location of the headset 105 determined using the motion data by applying a function of the offsets to the features observed in the overlapping portions of the camera fields of view. The VR console 110 may additionally or alternatively use the differences between the observations and the known geometric relationship between the cameras 120 to determine sizes of objects in the environment, improving the model of the environment for more accurately determining the position of the headset 105 in the environment and improving media presentation associated with the environment.

To improve the headset location and determine object sizes, the VR console 110 may use both features falling in the overlapped portions of the camera fields of view, as well as features falling in the portions of the camera fields of view that do not overlap. For features in the overlapped portions, the VR console 110 triangulates the positions of the features observed by each camera to determine the headset location and objects sizes. For features falling in the non-overlapping portions of the camera fields of view, the VR console 110 determines absolute distances between the features and the headset by estimating relative motion of the features. Because both cameras are fixed to the headset 105 with a given geometric relationship (e.g., given by a position vector from camera 120A to camera 120B), there is a known relationship between apparent velocities of the two cameras as the headset 105 is moved. If the movement of the headset 105 has non-zero angular motion, the VR console 110 computes the local velocity of the cameras 120 relative to one another by calculating a cross-product between the position vector between the cameras 120 and the rotational motion of the headset. If the movement of the headset 105 does not have angular motion, the VR console 110 computes the local velocity by determining locations of features at more than two positions of the headset 105. The VR console 110 then solves the following system of equations for scale_A and scale_B:

$$(scale_B)*B-(scale_A)*A=v_c$$

where A is a vector representing a distance between a feature and camera 120A in each of three dimensions, B is a vector representing a distance between the feature and camera 120B in each of the three dimensions, and $v_c$ is the relative local velocity of the cameras 120. The values scale_A and scale_B represent the full translational and rotational motion of the headset 105, and can be used to determine the headset location and the sizes of objects in the environment.

After determining the difference between the first and second observations of the new position of the VR headset 105, the VR console 110 may identify 424 one or more additional features in the environment using the image data from the first camera 120A and/or the second camera 120B. For example, the VR console 110 identifies features that were not visible to the cameras 120 at the initial position of the headset, but are visible at the new position. The additional features may then be used in determining positions of the headset subsequent to the new position. In one embodiment, the VR console 110 also determines features that have moved within the environment. For example, if a physical object in the environment moves as the user moves the headset 105, the VR console 110 may determine the new position of the object relative to the new position of the headset 105 after determining the position of the headset relative to static features in the environment.

The VR console 110 displays 426 media to the user of the VR headset 105 based at least in part on the new position of the headset 105 in the environment and the features in the environment. The media displayed to the user may include a representation of the environment in which the headset 105 is operated, as well as virtual augmentations to the environment. For example, the VR console 110 may augment the environment by adding virtual objects or characters to the environment, as displayed to the user by the electronic display 115. As the user moves within the environment, the VR console 110 may change the displayed media. For example, if the user turns his head to the left, the VR console 110 provides media that mirrors the user's movement (e.g., displays a new portion of the environment and new virtual objects in the new portion of the environment). Alternatively, the media displayed to the user may be affected by the environment and/or the user's movements through the environment without displaying a representation of the environment to the user. For example, the VR console 110 may display a virtual object instead of a physical object present in the environment, and display the virtual object being moved when the user moves the physical object.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a virtual reality (VR) headset;
   a first camera and a second camera on the VR headset, each camera having a field of view and capturing image data of an environment of the VR headset, wherein at least a portion of the fields of view of the first camera and the second camera do not overlap; and
   a processor receiving the image data from the first camera and the second camera and configured to determine a new position of the VR headset after the VR headset has been moved from an initial position to the new position, the determination of the new position comprising:
      performing a simultaneous localization and mapping (SLAM) algorithm on image data received from the first camera to obtain a first direction vector, the first direction vector representing a velocity direction of the first camera as the VR headset was moved from the initial position to the new position,
      performing a SLAM algorithm on image data received from the second camera to obtain a second direction vector, the second direction vector representing a velocity direction of the second camera as the VR headset was moved from the initial position to the new position,
      computing a relative local velocity representing a relative velocity between the first camera and the second camera as the VR headset was moved from the initial position to the new position, and
      determining the new position based on the first direction vector, the second direction vector, and the relative local velocity.

2. The system of claim 1, wherein determining the new position based on the first direction vector, the second direction vector, and the relative local velocity comprises:
   determining, based on the first direction vector, the second direction vector, and the relative local velocity, a first scalar value associated with the first camera and a second scalar value associated with the second camera,
   wherein the first scalar value and the second scalar value represent translational and rotational motion of the VR headset as the VR headset was moved from the initial position to the new position.

3. The system of claim 1, further comprising:
   an inertial measurement unit (IMU) comprising one or more motion sensors on the VR headset and generating motion data based on measurement signals from the motion sensors.

4. The system of claim 3, wherein the motion data includes a rotational motion of the VR headset as the VR headset was moved from the initial position to the new position, and wherein computing the relative local velocity comprises:
   determining a rotation vector representing the rotational motion of the VR headset; and
   computing a cross product between the rotation vector and a rotation vector representing a geometric relationship between the first camera and the second camera.

5. The system of claim 3, wherein the VR headset comprises an electronic display configured to display media to a user, and wherein the processor is further configured to display media to the user based at least in part on the motion data.

6. The system of claim 1, wherein the processor is further configured to identify the initial position of the VR headset, the identification of the initial position comprising:
   capturing first image data with the first camera while the VR headset is in the initial position;
   identifying features in the first image data;
   determining, based on the identified features in the first image data, distances between a reference point on the headset and one or more of the identified features in the first image data;
   capturing second image data with the second camera while the VR headset is in the initial position;
   identifying features in the second image data;
   determining, based on the identified features in the second image data, distances between the reference point on the headset and one or more of the identified features in the second image data.

7. The system of claim 6, wherein at least a portion of the fields of view of the first camera and the second camera overlap, and wherein the processor is further configured to:
   correlate between features observed in the overlapping portion of the fields of view and identified in both the first image data and the second image data.

8. The system of claim 7, wherein the processor is further configured to:
   after the VR headset has been moved from the initial position to the new position, identify one or more additional features in the non-overlapping portion of the fields of view based on image data captured by the first camera at the new position and the image data captured by the second camera the new position.

9. A method comprising:
   receiving image data of an environment of a virtual reality (VR) headset, the image data captured by a first camera and a second camera coupled to the VR headset and each having a field of view, wherein at least a portion of the fields of view of the first camera and the second camera do not overlap;
   performing a simultaneous localization and mapping (SLAM) algorithm on image data received from the first camera to obtain a first direction vector, the first direction vector representing a velocity direction of the first camera as the VR headset was moved from an initial position to a new position;
   performing a SLAM algorithm on image data received from the second camera to obtain a second direction vector, the second direction vector representing a velocity direction of the second camera as the VR headset was moved from the initial position to the new position;
   computing a relative local velocity representing a relative velocity between the first camera and the second camera as the VR headset was moved from the initial position to the new position; and
   determining the new position based on the first direction vector, the second direction vector, and the relative local velocity.

10. The method of claim 9, wherein determining the new position based on the first direction vector, the second direction vector, and the relative local velocity comprises:
    determining, based on the first direction vector, the second direction vector, and the relative local velocity, a first scalar value associated with the first camera and a second scalar value associated with the second camera, wherein the first scalar value and the second scalar value represent translational and rotational motion of the VR headset as the VR headset was moved from the initial position to the new position.

11. The method of claim 9, further comprising:
receiving motion data from by an inertial measurement unit (IMU), the IMU comprising one or more motion sensors on the VR headset and generating the motion data based on measurement signals from the motion sensors.

12. The method of claim 11, wherein the motion data includes a rotational motion of the VR headset as the VR headset was moved from the initial position to the new position, and wherein computing the relative local velocity comprises:
determining a rotation vector representing the rotational motion of the VR headset; and
computing a cross product between the rotation vector and a rotation vector representing a geometric relationship between the first camera and the second camera.

13. The method of claim 11, further comprising:
displaying, media based at least in part on the motion data on an electronic display of the VR headset.

14. The method of claim 9, further comprising identifying the initial position of the VR headset, the identification of the initial position comprising:
capturing first image data with the first camera while the VR headset is in the initial position;
identifying features in the first image data;
determining, based on the identified features in the first image data, distances between a reference point on the headset and one or more of the identified features in the first image data;
capturing second image data with the second camera while the VR headset is in the initial position;
identifying features in the second image data;
determining, based on the identified features in the second image data, distances between the reference point on the headset and one or more of the identified features in the second image data.

15. The method of claim 14, wherein at least a portion of the fields of view of the first camera and the second camera overlap, and further comprising:
correlating between features observed in the overlapping portion of the fields of view and identified in both the first image data and the second image data.

16. The method of claim 15, further comprising:
after the VR headset has been moved from the initial position to the new position, identifying one or more additional features in the non-overlapping portion of the fields of view based on image data captured by the first camera at the new position and the image data captured by the second camera the new position.

17. A non-transitory computer-readable storage medium comprising computer program code, the computer program code when executed by a processor causing the processor to perform steps comprising:
receiving image data of an environment of a virtual reality (VR) headset, the image data captured by a first camera and a second camera coupled to the VR headset and each having a field of view, wherein at least a portion of the fields of view of the first camera and the second camera do not overlap;
performing a simultaneous localization and mapping (SLAM) algorithm on image data received from the first camera to obtain a first direction vector, the first direction vector representing a velocity direction of the first camera as the VR headset was moved from an initial position to a new position;
performing a SLAM algorithm on image data received from the second camera to obtain a second direction vector, the second direction vector representing a velocity direction of the second camera as the VR headset was moved from the initial position to the new position;
computing a relative local velocity representing a relative velocity between the first camera and the second camera as the VR headset was moved from the initial position to the new position; and
determining the new position based on the first direction vector, the second direction vector, and the relative local velocity.

18. The computer-readable storage medium of claim 17, wherein determining the new position based on the first direction vector, the second direction vector, and the relative local velocity comprises:
determining, based on the first direction vector, the second direction vector, and the relative local velocity, a first scalar value associated with the first camera and a second scalar value associated with the second camera, wherein the first scalar value and the second scalar value represent translational and rotational motion of the VR headset as the VR headset was moved from the initial position to the new position.

19. The computer-readable storage medium of claim 17, the steps further comprising:
receiving motion data from by an inertial measurement unit (IMU), the IMU comprising one or more motion sensors on the VR headset and generating the motion data based on measurement signals from the motion sensors.

20. The computer-readable storage medium of claim 19, wherein the motion data includes a rotational motion of the VR headset as the VR headset was moved from the initial position to the new position, and wherein computing the relative local velocity comprises:
determining a rotation vector representing the rotational motion of the VR headset; and
computing a cross product between the rotation vector and a rotation vector representing a geometric relationship between the first camera and the second camera.

* * * * *